United States Patent [19]
Tanaka

[11] Patent Number: 6,154,252
[45] Date of Patent: Nov. 28, 2000

[54] IMAGING DEVICE FOR USE AS RADIATION DETECTOR

[75] Inventor: Akio Tanaka, Tokyo, Japan

[73] Assignee: NEC Corporation, Tokyo, Japan

[21] Appl. No.: 08/968,353

[22] Filed: Nov. 12, 1997

[30] Foreign Application Priority Data

Nov. 13, 1996 [JP] Japan ................................ 8-301809

[51] Int. Cl.[7] ........................... H04N 5/33; H04N 5/335; G03C 5/16; G02F 1/01
[52] U.S. Cl. ......................... 348/164; 348/162; 250/318; 250/330
[58] Field of Search .................................. 348/164, 162, 348/180; 250/318, 316.1, 330–334, 336.1, 338.1, 339.01, 339.02, 339.03, 339.04, 339.11, 339.14, 341.8

[56] References Cited

U.S. PATENT DOCUMENTS

| | | | |
|---|---|---|---|
| 4,121,459 | 10/1978 | MaCall et al. | 374/124 |
| 5,261,011 | 11/1993 | Meyers | 382/103 |
| 5,528,035 | 6/1996 | Masarik et al. | 250/338.3 |
| 5,591,973 | 1/1997 | Masarik et al. | 250/332 |
| 5,654,700 | 8/1997 | Prata et al. | 340/963 |
| 5,665,959 | 9/1997 | Fossum et al. | 250/208.1 |
| 5,763,882 | 6/1998 | Klapper et al. | 250/332 |
| 5,811,808 | 9/1998 | Cannata et al. | 250/332 |
| 5,844,238 | 12/1998 | Sauer et al. | 250/332 |
| 5,861,625 | 1/1999 | Wurden | 250/338.1 |
| 5,926,217 | 7/1999 | Peterson et al. | 348/301 |
| 6,051,826 | 4/2000 | Arimoto et al. | 250/208.1 |

FOREIGN PATENT DOCUMENTS

| | | | |
|---|---|---|---|
| 0 135 035 | 3/1985 | European Pat. Off. | H04N 5/243 |
| 0 213 867 | 3/1987 | European Pat. Off. | H04N 5/33 |
| 0 487 384 A1 | 5/1992 | European Pat. Off. | G06F 15/68 |
| 0 677 957 A2 | 10/1995 | European Pat. Off. | H04N 5/33 |
| 58-166227 | 10/1983 | Japan | G01J 5/48 |
| 63-13478 | 1/1988 | Japan | H04N 5/335 |
| 63-56467 | 4/1988 | Japan | G01J 5/48 |
| 1-102330 | 4/1989 | Japan | G01J 5/48 |
| 1-178832 | 7/1989 | Japan | G01J 1/44 |
| 1-287428 | 11/1989 | Japan | G01J 5/48 |
| 2-107074 | 4/1990 | Japan | H04N 5/33 |
| 3-87620 | 4/1991 | Japan | H04N 5/33 |
| 4-257831 | 9/1992 | Japan | G01J 1/44 |
| 6-129906 | 5/1994 | Japan | G01J 1/44 |
| 07137062 | 5/1995 | Japan | B29C 43/24 |
| 7-184110 | 7/1995 | Japan | H04N 5/243 |
| 8-46870 | 2/1996 | Japan | H04N 5/33 |
| 08105794 | 4/1996 | Japan | G01J 1/02 |
| 9-33342 | 2/1997 | Japan | G01J 1/04 |
| 9-130680 | 5/1997 | Japan | G01J 1/02 |

*Primary Examiner*—Vu Le
*Attorney, Agent, or Firm*—Hutchins, Wheeler & Dittmar

[57] ABSTRACT

An imaging device has a control block for offsetting signal levels and controlling the amplification factor for the signal levels within one frame. The imaging device can image a subject having low-illuminance and high-illuminance areas without reduction in the sensitivity, and allows a wide dynamic range and high sensitivity to be achieved real-time. The imaging device thus can image subjects of different illuminance levels ranging from a low illuminance subject to a high-illuminance subject, and can differentiate small illuminance distributions.

56 Claims, 6 Drawing Sheets

IMAGING DEVICE FOR USE AS RADIATION DETECTOR

BACKGROUND OF THE INVENTION

1. Field of the Invention

The present invention relates to an imaging device, and more particularly to an infrared imaging device for use in temperature measurements, etc.

2. Description of the Related Art

Infrared sensors convert an infrared radiation from the surface of a subject into an electric signal and displays the image of the subject based on the electric signal for measuring a temperature distribution, etc. of the surface of the subject. The infrared sensors are required to have excellent temperature resolution so as to be able to distinguish small temperature differences and also to have a wide dynamic range so as to cover a wide range of temperatures that can be measured.

FIG. 1 of the accompanying drawings shows a conventional image sensor which includes at least bolometers 1 thermally isolated from a substrate (not shown) and serving as respective pixels, a vertical shift register 9, a horizontal shift register 11, and integrating circuits 14, 15 for converting a change in resistance into a change in voltage. When infrared energy is radiated from a subject to be imaged, the radiated infrared energy is converged onto the imaging device by an optical system, causing changes in the temperature of the bolometers 1, which result in changes in the resistance of the bolometers 1. The pixels are successively selected by the vertical shift register 9 and the horizontal shift register 11, and the changes in the resistance of the bolometers 1 are successively converted into electric signals by the integrating circuits 14, 15. For further details, reference should be made to Japanese laid-open patent publication 105794/1996.

Japanese laid-open patent publication 1989-102330 discloses another conventional imaging device which comprises an infrared sensor, a subtractor, a central temperature setting circuit, a gain selector, and a peak hold circuit. A temperature distribution of a subject to be imaged is converted into an electric signal by the infrared sensor. Signals from the pixels are successively read as with ordinary television signals. The peak hold circuit holds maximum and minimum levels of the pixel signals that have been read, and the gain of the gain selector is controlled to bring the signal levels into a desired dynamic range. The user of the imaging device manually sets the central temperature setting circuit to a desired central temperature.

A thermal infrared imaging device revealed in Japanese laid-open patent publication 1996-46870 has an automatic level controller and an automatic gain controller. The automatic level controller controls an offset level to be added to a video signal such that the signal levels of half of total pixels will be in a lower half of the dynamic range and the signal levels of the remaining half of total pixels will be in an upper half of the dynamic range. The automatic gain controller controls a gain such that the signal levels of the pixels will be in 10% to 90% of the dynamic range.

Japanese laid-open patent publication 137062/1995 shows an imaging device in which the difference between bright and dark levels of captured images is increased by an automatic gain control (AGC) process.

An infrared imaging device disclosed in Japanese laid-open patent publication 107074/1990 has a gain correcting circuit for correcting sensitivity variations of pixels of the infrared imaging device to suppress fixed pattern noise (fixed DC level variations between the pixels) which is generated when the temperature of a subject being imaged is greatly changed.

The conventional imaging devices referred to above, however, suffer the following shortcomings:

(1) In the image sensor disclosed in Japanese laid-open patent publication 105794/1996, any change in the temperature of the bolometers due to incident infrared radiation is very small, and the image sensor itself has a very large dynamic range. For example, when a subject having a temperature difference of 1° C. is imaged, the temperature of the bolometers changes only by $2 \times 10^{-3}$° C. Even when a subject having a temperature of several hundred degrees centigrade is imaged, any change in the temperature of the bolometers does not exceed 1° C. Therefore, the dynamic range of the thermal infrared imaging device is determined by the dynamic range of an amplifier, etc. which amplifies a video signal from the image sensor.

For imaging a subject having a low-illuminance area and a high-illuminance area, since the amplification factor of the amplifier is lowered so that signal levels from the low-illuminance area and the high-illuminance area will enter the dynamic range, the temperature resolution is lowered, resulting in a failure to observe a small illuminance distribution on the surfaces of the subjects.

(2) The imaging devices disclosed in Japanese laid-open patent publications 102330/1980, 46870/1996, and 137062/1995 have the same problems as described above because they have AGC circuits or similar circuits and the amplification factor of the amplifier and the offset level for the video signal are controlled by the AGC circuits or similar circuits such that the signal levels of an overall subject to be imaged will enter the dynamic range.

The infrared imaging device disclosed in Japanese laid-open patent publication 107074/1990 fails to solve the above problems because it corrects the gain variations of individual pixels for producing uniform images.

SUMMARY OF THE INVENTION

It is therefore an object of the present invention to provide an imaging device capable of imaging subjects ranging from a low-illuminance subject to a high-illuminance subject and of distinguishing slight illuminance distributions.

In the arrangement of the present invention, since signal levels and amplification factors for the signal levels are changed in one frame depending on the intensities of light incident upon the detecting means, a subject having low-illuminance and high-illuminance areas can be imaged under signal processing conditions optimum for the low-illuminance and high-illuminance areas.

A frequency map of the intensities of light incident upon the detecting means is generated, and signal levels in the frequency map are converted into parts having frequencies greater than a given level, thus providing data required to determine offset levels and amplification factors.

When offset levels and amplification factors are changed, those image areas where they are changed may be displayed in colors or in different display windows or monitor display units for thereby allowing the user to distinguish the displayed areas.

The above and other subjects, features, and advantages of the present invention will become apparent from the following description with reference to the accompanying drawings which illustrate examples of the present invention.

BRIEF DESCRIPTION OF THE DRAWINGS

FIG. 5b is a diagram showing a frequency map of the intensities of light shown in FIG. 5a;

DETAILED DESCRIPTION OF THE PREFERRED EMBODIMENTS

Figure 1:
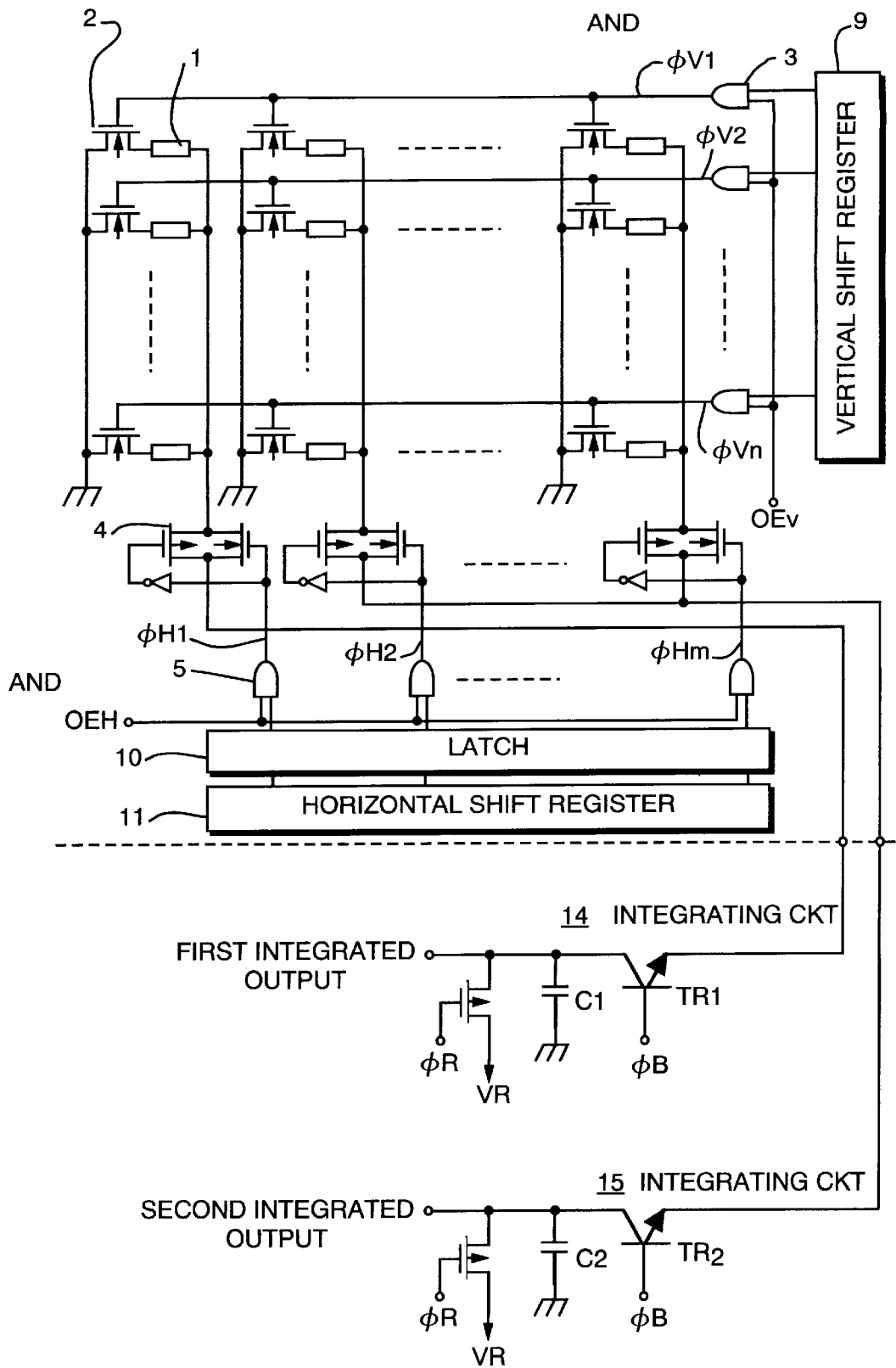
FIG. 1 is a circuit diagram, partly in block form, of a conventional infrared imaging device.
Figure 2:
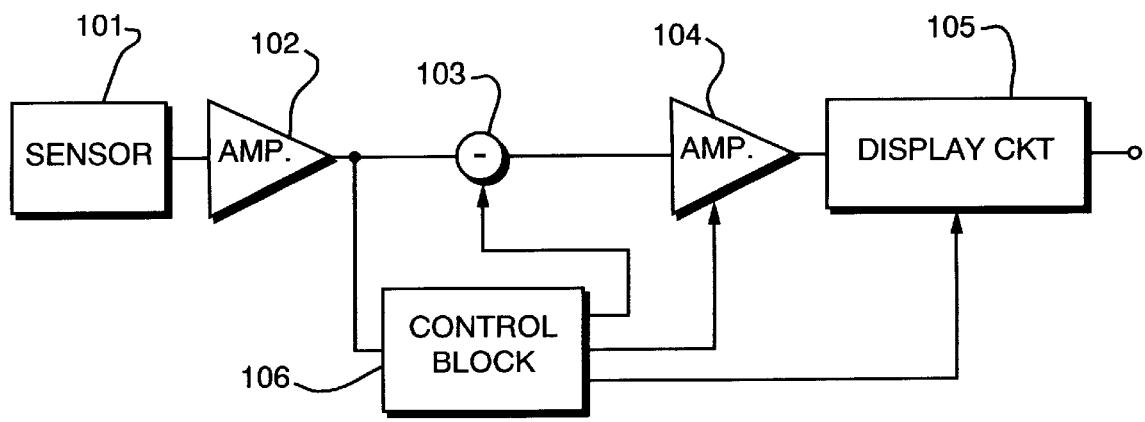
FIG. 2 is a block diagram of an imaging device according to the present invention.

As shown in FIG. 2, an imaging device according to the present invention comprises a sensor 101 as detecting means for detecting infrared energy radiated from a subject, converting the detected infrared energy into an electric signal, and outputting the electric signal, an amplifier 102 as first amplifying means for amplifying the electric signal from the sensor 101 and outputting the amplified electric signal, a control block 106 for determining low-illuminance and high-illuminance areas of the subject based on a relatively less amplified electric signal of the electric signal outputted from the amplifier 102, generating an offset level, a designated amplification factor, and a display switching signal within one frame, a subtractor 103 for subtracting the offset level outputted from the control block 106 from the electric signal outputted from the amplifier 102, a variable-gain amplifier 104 for amplifying a signal outputted from the subtractor 103 based on the designated amplification factor outputted from the control block 106 and outputting the amplified signal, and a display circuit 105 as display means for selectively displaying the low-illuminance and high-illuminance areas of the subject and an intermediate-illuminance area, if any, of the subject based on the signal outputted from the variable-gain amplifier 104 according to the display switching signal outputted from the control block 106. The subtractor 103 may be replaced with an adder if the sign of the offset level is changed.

Operation of the imaging device will be described below.

When infrared energy is radiated from the subject, the radiated infrared energy is detected by the sensor 101, which converts the detected infrared energy into an electric signal and outputs the electric signal.

The amplifier 102 amplifies the electric signal outputted from the sensor 101 with a predetermined amplification factor, and outputs the amplified electric signal to the subtractor 103 and the control block 106.

The control block 106 determines low-illuminance and high-illuminance areas of the subject based on a relatively less amplified electric signal of the electric signal outputted from the amplifier 102, generates within one frame an offset level as a quantity to be subtracted by the subtractor 103, a designated amplification factor as an amplification factor for use in the variable-gain amplifier 104, and a display switching signal for selecting images to be displayed in the display circuit 105, and outputs the offset level, the designated amplification factor, and the display switching signal in a real-time manner.

The subtractor 103 subtracts the offset level outputted from the control block 106 from the electric signal outputted from the amplifier 102.

The variable-gain amplifier 104 amplifies a signal outputted from the subtractor 103 based on the designated amplification factor outputted from the control block 106 and outputs the amplified signal.

The display circuit 105 selectively displays the low-illuminance and high-illuminance areas of the subject and an intermediate-illuminance area, if any, of the subject based on the signal outputted from the variable-gain amplifier 104 according to the display switching signal outputted from the control block 106.

Figure 3:
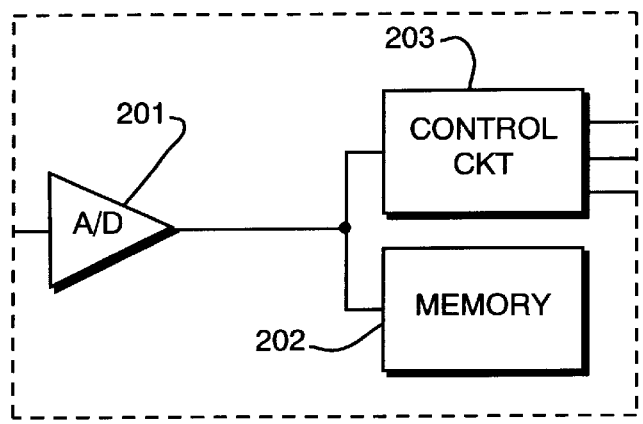
FIG. 3 is a block diagram of a control block for use in the imaging device shown in FIG. 2.

As shown in FIG. 3, one arrangement of the control block 106 comprises an A/D converter 201 for converting the electric signal outputted from the sensor 101 into a digital signal, a memory 202 for storing data to be used in the generation of a frequency map and other processing, and a control circuit 203 for generating a frequency map of intensities of light (magnitudes of video signals) incident upon the sensor 101, calculating an offset level and an amplification factor optimum for the low-illuminance and high-illuminance areas depending on the low-illuminance and high-illuminance areas, and outputting the offset level and the amplification factor that are calculated. Calculations in the control circuit 203 are carried out on the data of a certain frame, and are reflected in the data of a next frame.

Figure 4:
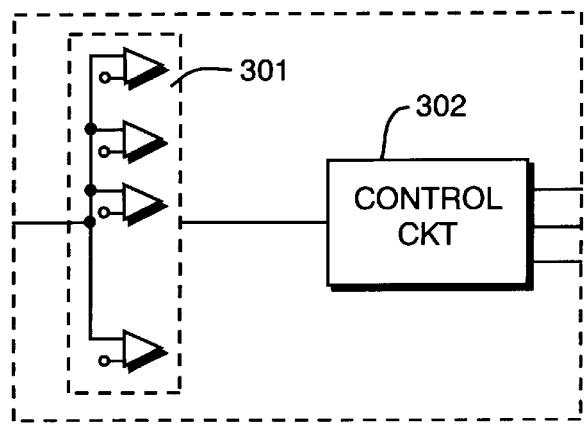
FIG. 4 is a block diagram of another control block for use in the imaging device shown in FIG. 2.

As shown in FIG. 4, another arrangement of the control block comprises a comparator 301 for determining low-illuminance and high-illuminance areas, and a control circuit 302 for generating an offset level and an amplification factor based on the result from the comparator 301 and outputting the offset level and the amplification factor that are generated. The control block shown in FIG. 4 allows the decision about a certain pixel to be instantly reflected in the control of that pixel. While the control block shown in FIG. 4 is simple in circuit arrangement, it is unable to perform complex control processes for automatically changing offset levels and amplification factors depending on the subject.

Operation of the control circuit 203 shown in FIG. 3 will be described below.

Figure 5A:
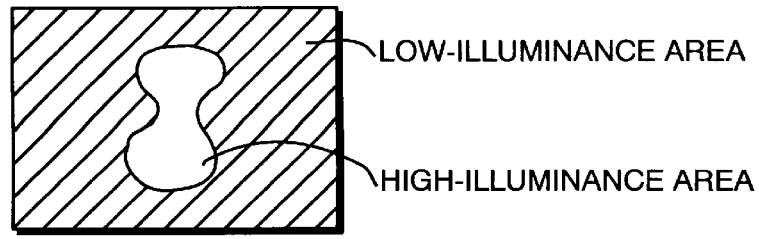
FIG. 5a is a diagram showing intensities of light from a subject, illustrative of the manner in which a control circuit shown in FIG. 3 operates.

It is assumed that there is a subject having both low-illuminance and high-illuminance areas mixed together as shown in FIG. 5a.

If the subject shown in FIG. 5a is imaged by the conventional imaging devices, then since the signal level of the high-illuminance area would tend to fall out of the dynamic range, the aperture of the optical system is adjusted or the AGC circuit is operated to bring the signal level of the high-illuminance area into the dynamic range, but such processes result in an overall reduction in the sensitivity and the temperature resolution. The dynamic range referred to above may represent the dynamic range of the sensor, the dynamic range of the amplifier, the dynamic range of the A/D converter, or the dynamic range of a display monitor unit. With the thermal infrared sensor, however, the dynamic range of the sensor is not limitative as it is very large as described above.

An infrared imaging device, for example, usually has a temperature resolution of about 0.1° C. at minimum, and a dynamic range of at most 100° C. Therefore, when a hot object having a temperature of several hundred degrees centigrade is to be imaged as a subject, the overall sensitivity, i.e., the temperature resolution of the infrared imaging device has to be lowered.

Figure 5B:
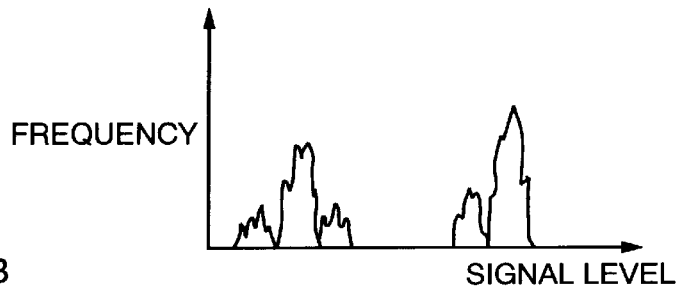

To this end, as shown in FIG. 5b, pixel signals from the imaged subject are read, and a frequency map is generated which has a horizontal axis representing intensities of incident light (magnitudes of video signals) and a vertical axis representing frequencies with respect to the light intensities. The frequency map shown in FIG. 5b contains level peaks corresponding to the low-illuminance area and level peaks corresponding to the high-illuminance area.

A process of generating the frequency map will be described below with reference to FIGS. 1 through 5a–5f.

When the amplified electric signal from the amplifier 101 is supplied to the control block 106, the electric signal levels of respective pixels (intensities of the incident light) are successively converted into corresponding digital values by the A/D converter 201. The digital values have signal levels which may range from 0 to 255, for example.

In the control circuit 203, the digital values from the A/D converter 201 are stored as data at addresses in the memory 202, and the data at the addresses are incremented. When a signal level of 0 is supplied from the A/D converter 201 to the memory 202, "1" is added to the data at an address "0" in the memory 202, and the resultant data is returned to the address "0". Successive signal levels supplied from the A/D converter 201 are similarly stored at the respective addresses in the memory 202. The data stored in the memory 202 are cleared in every frame. In this manner, a frequency map of the signal levels ranging from 0 to 255 is generated. While the digital values are illustrated as having signal levels ranging from 0 to 255, the digital values may be represented by more bits. The horizontal axis of the frequency map may not necessarily represent as many bits as the bits of the signal levels of the digital values, but may represent high-order bits of the signal levels of the digital values, thereby reducing the number of bits on the horizontal axis.

Figure 5C:
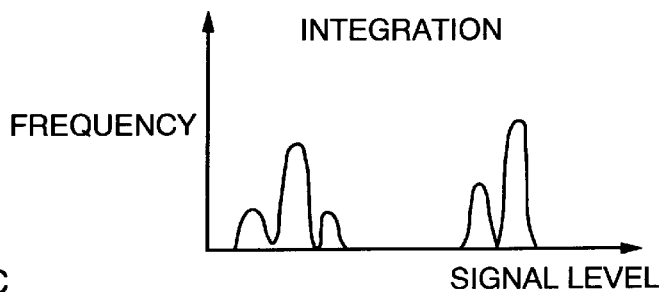
FIG. 5c is a diagram showing signals produced when the frequency map shown in FIG. 5b is integrated with respect to signal levels.

In the frequency map shown in FIG. 5b, the signal levels (incident light intensities) suffer small variations or fluctuations due to noise or the like. If such small variations or fluctuations were left unremoved, then they would possibly impair subsequent signal processing. Therefore, it is preferable to integrate the frequency map with respect to the signal levels (incident light intensities) as shown in FIG. 5c.

While various techniques are available for numerical integration, one relatively simple integrating process will be described below.

A frequency map prior to being integrated and a frequency map after being integrated are stored in separate memory areas, and the frequency of a certain signal level prior to being integrated and the frequencies of signal levels immediately before and after the certain signal level are averaged, after which the averaged value is stored in the frequency map after being integrated.

The above process is carried out on all signal levels, thereby completing the integration of the frequency map in its entirety.

Rather than using a certain signal level and signal levels immediately before and after the certain signal level, such a certain signal level and a plurality of signal levels in the vicinity of the certain signal level may be averaged. The signal levels in the vicinity of the certain signal level may be weighted by a coefficient depending on the distance from the certain signal level.

Figure 5D:
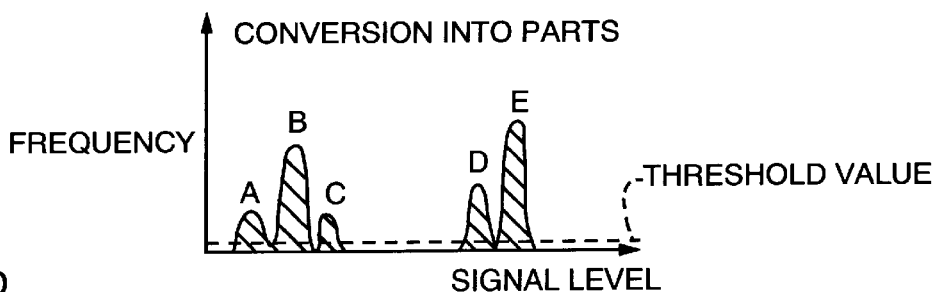
FIG. 5d is a diagram showing signal parts converted from the signal levels shown in FIG. 5c using a threshold value.

Then, as shown in FIG. 5d, in order to avoid the influence of noise or the like, a certain threshold value is established in the frequency map, and the signal levels beyond the threshold value are converted into parts. For example, such parts are marked with A, B, C, D, E, and the signal level ranges of the parts A, B, C, D, E are stored in a memory area.

Figure 5E:
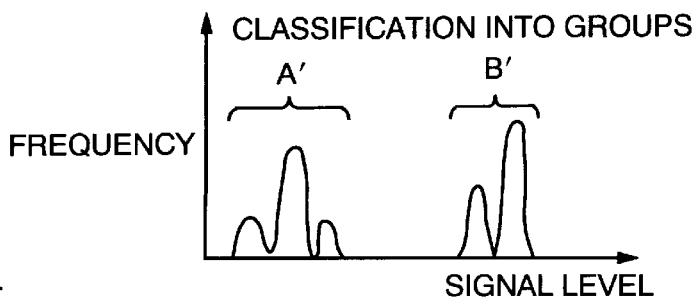
FIG. 5e is a diagram showing groups into which the signal parts shown in FIG. 5d are classified.

When the signal levels beyond the threshold value are converted into parts, since the same subject may be divided into a plurality of parts, as shown in FIG. 5d, the parts are preferably classified into groups as shown in FIG. 5e. In the illustrated example, the parts A, B, C are classified into a low-illuminance group, and the parts D, E are classified into a high-illuminance group.

The signal level ranges of the parts A, B, C, D, E have already been determined in the step shown in FIG. 5d. Based on the determined signal level ranges, those parts which are spaced by a distance smaller than a certain distance level are classified into the same group. The signal level ranges of the groups are stored in a memory area.

In FIG. 5e, the parts are classified into the two groups, i.e., the low-illuminance group and the high-illuminance group. However, some subjects may generate more groups of parts converted from signal levels. Though it is possible to give optimum offset levels and amplification factors to all such groups, it will require complex display means to display all the groups.

There are available several methods of displaying, not all of a plurality of groups, but certain ones of the groups.

According to one method, for example, the total frequency of signal levels in each of the groups is calculated, and several groups with high frequencies are displayed. According to another process, a certain signal level (incident light intensity) or certain signal levels (incident light intensities) are established, and a group or groups closest to the certain signal level or levels are displayed. Another method determines a certain location at the center of the display screen, for example, and displays groups that contain the location.

An infrared imaging device, for example, is required to display at all times regions near normal temperature for positioning purpose. Therefore, the infrared imaging device employs a process of necessarily selecting groups near normal temperature and selecting one other group from those groups which have high total frequencies, which have a certain temperature, or which belong to a certain location.

Subsequently, an offset level and an amplification factor which are optimum for each of the selected groups are determined.

Figure 5F:
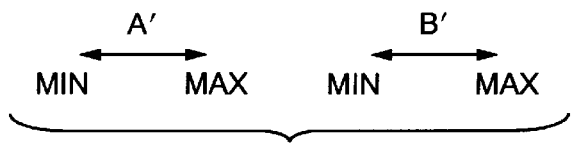
FIG. 5f is a diagram showing minimum and maximum values of signal level ranges in the groups shown in FIG. 5e.

As shown in FIG. 5f, an offset level for a certain group is determined as (max−min)/2 where max represents the maximum value of signal level ranges of the group and min the minimum value of signal level ranges of the group.

The offset level is supplied to the subtractor 103, which subtracts the offset level from a video signal outputted from the amplifier 102.

Since the offset level is changed real-time in one frame, signal levels from a high-illuminance area which would otherwise be excluded from the dynamic range will fall in the dynamic range without lowering the sensitivity.

Various methods are available for establishing a reference level for video signals.

Usually, the sensor 101 often incorporates an optically black pixel OB which is insensitive to light, and the level of a signal generated by the optically black pixel OB is used as a reference level.

In an infrared imaging device, the pixel signals vary about the signal level of the optically black pixel OB. In a visible imaging device, since the optically black pixel OB is the darkest pixel, the pixel signals do not vary about the signal level of the optically black pixel OB, but vary about a level higher than the signal level of the optically black pixel OB. The signal level of the optically black pixel OB may be established as a reference level.

Rather than the signal level of the optically black pixel OB, the average of the signal levels from all the pixels may be established as a reference level.

At any rate, a reference level may be established as an arbitrary level. While the value of the offset level (max−min)/2 may be variable depending on the reference level, this is caused by the reference level, and the offset level (max−min)/2 still remains to be subtracted from the video signal outputted from the amplifier 102.

The amplification factor optimum for each of the groups is established generally in proportion to 1/(max−min), and outputted to the variable-gain amplifier 104.

The amplification factor may be very large depending on the subject. When the video signal is amplified beyond a certain level, the net effect is that only noise contained in the video signal becomes conspicuous. For this reason, a maximum amplification factor may be established, and any amplification factors beyond a certain value may be set to the maximum amplification factor.

As described above, the amplification factor is changed real-time in one frame for thereby establishing amplification factors optimum for groups or objects having arbitrary levels of brightness.

While the process of determining offset levels and amplification factors optimum for groups has been described above, parts may be used instead of groups if the parts are not classified into groups.

In certain applications, amplification factors may be established manually and offset levels may be established automatically, or conversely offset levels may be established manually and amplification factors may be established automatically, or further alternatively, both offset levels and amplification factors may be established manually. These processes of establishing offset levels and amplification factors are based on the principles of the present invention insofar as the offset levels and the amplification factors are changed in one frame.

According to the above process of generating a frequency map, the frequency map is generated using the data of all pixels in a certain frame. However, it is not necessary to generate a frequency map in every frame. Though calculations may be made in every frame, since abrupt changes in offset levels and amplification factors tend to impair the quality of displayed images, the offset levels and the amplification factors should preferably be changed with a long time constant. For example, offset levels and amplification factors calculated in every frame may be integrated over a plurality of frames.

As described above, offset levels and amplification factors are changed depending on low-illuminance and high-illuminance areas. Consequently, if the video signal outputted from the variable-gain amplifier 104 is directly displayed, incident lights having different intensities will be displayed as signals of the same level.

To avoid the above drawback, the process of displaying images is changed at the same time that offset levels and amplification factors are changed.

Figure 6:
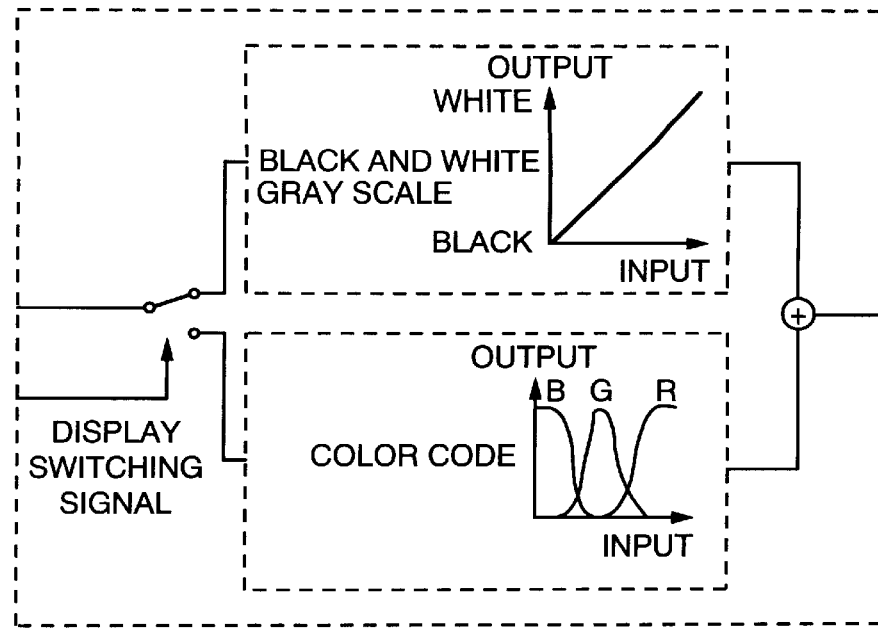
FIG. 6 is a block diagram illustrative of a specific mode of operation of a display circuit of the imaging device shown in FIG. 2.

The control block 106 changes offset levels and amplification factors at the time when the signal is outputted from the low-illuminance area, and indicates to the display circuit 105 that the signal is being outputted from the low-illuminance area. The display circuit 105 sets a display mode to a black-and-white gray scale display mode, for example (see FIG. 6). Similarly, the control block 106 changes offset levels and amplification factors at the time when the signal is outputted from the high-illuminance area, and indicates to the display circuit 105 that the signal is being outputted from the high-illuminance area. The display circuit 105 sets a display mode to a color code display mode, for example. In the color code display mode, as shown in FIG. 6, blue (B), green (G), and red (R) levels are appropriately changed depending on the signal level. This allows the observer to distinguish mixed video signals displayed on one display screen.

Figure 7:
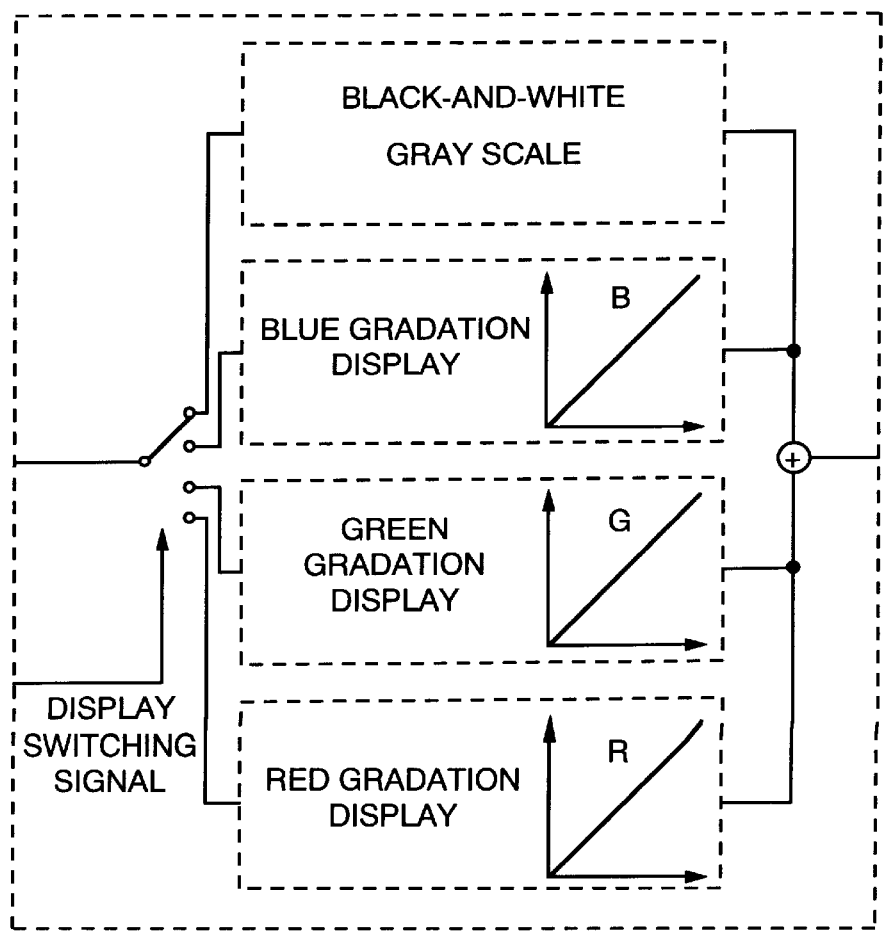
FIG. 7 is a block diagram illustrative of another specific mode of operation of the display circuit of the imaging device shown in FIG. 2.

As shown in FIG. 7, the display circuit may display a group in a black-and-white gray scale display mode, another group in a blue gradation display mode with different densities of blue, still another group in a green gradation display mode, and still yet another group in a red gradation display mode. This also allows the observer to distinguish mixed video signals displayed on one display screen. The number of groups that can be displayed may be increased by using gradation display modes of other additional colors.

Figure 8:
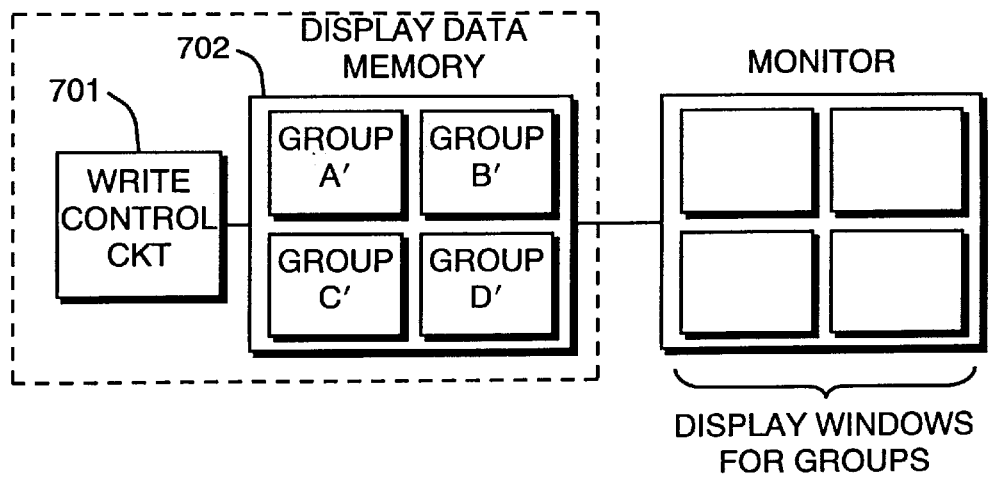
FIG. 8 is a block diagram illustrative of still another specific mode of operation of the display circuit of the imaging device shown in FIG. 2.

In FIG. 8, the display circuit has a display data memory 702 for storing data to be displayed in display windows on the display screen, and a write control circuit 701 for storing data into the display data memory 702.

The display circuit shown in FIG. 8 displays video signals of different groups in the respective display windows on the display screen. Therefore, the displayed video signals of different groups will not possibly be recognized as having the same signal level.

Figure 9:
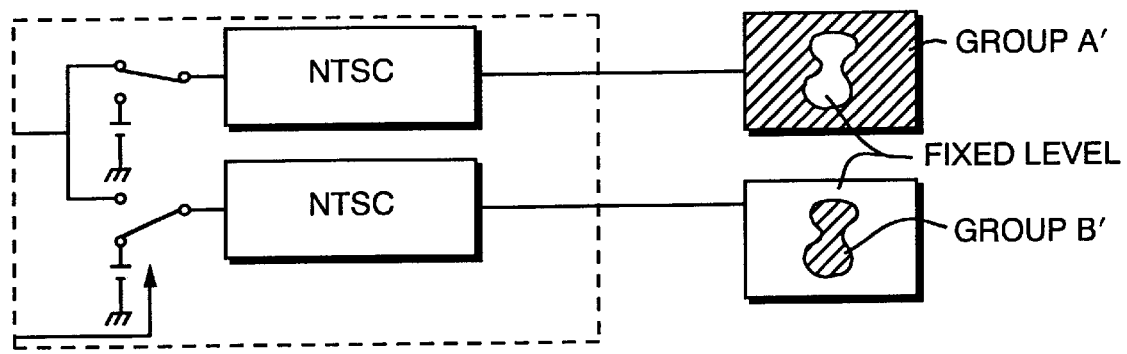
FIG. 9 is a block diagram illustrative of yet still another specific mode of operation of the display circuit of the imaging device shown in FIG. 2.

In FIG. 9, there are a plurality of display monitor units and the display circuit has a plurality of video output circuits (NTSC) for displaying images of different groups on the display monitor units, respectively. Areas other than the groups are fixed to a certain signal level.

Figure 10:
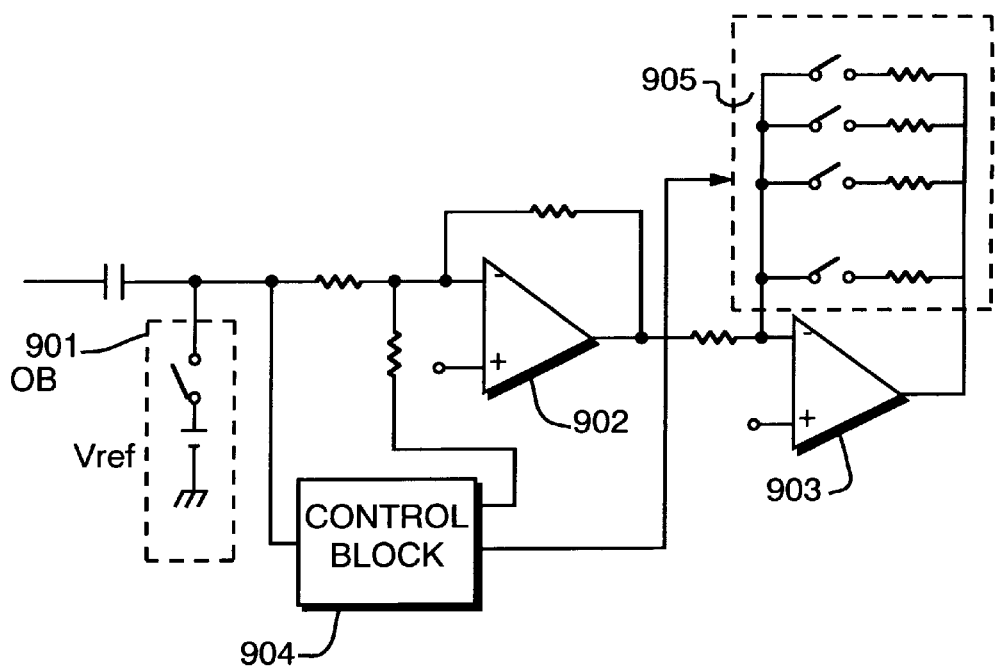
FIG. 10 is a detailed circuit diagram, partly in block form, of a subtractor, a variable-gain amplifier, and related circuits of the imaging device shown in FIG. 2.

FIG. 10 shows in detail the subtractor 103, the variable-gain amplifier 104, and related circuits of the imaging device shown in FIG. 2. In FIG. 10, the signal level of the optically black pixel OB is clamped to a level Vref by an OB clamp circuit 901 for thereby setting the reference level for video signals to the level Vrel. An operational amplifier 902 as an adder operates as a subtractor when an inverted offset signal is outputted from a control block 904. An operational amplifier 903 serves as a variable-gain amplifier whose amplification factor is controlled by selecting a resistance of a feedback resistance block 905 based on a signal outputted from the control block 904.

With the present invention, the imaging device has a control block for offsetting a signal level in one frame and controlling the amplification factor of the signal level based on the intensity of incident light for producing a video signal. Therefore, a subject containing low-illuminance and high-illuminance areas can be imaged without a reduction in the sensitivity, and hence a wide dynamic range and a high sensitivity level can be achieved real-time.

If the principles of the present invention are applied to a thermal infrared imaging device, then a very wide dynamic range of the sensor of the thermal infrared imaging device can effectively be utilized. When a furnace which requires delicate temperature control is to be observed for temperatures, it has heretofore been impossible to measure the temperatures of the furnace with high resolution because signals based on infrared energy radiated from the furnace need to be brought into the dynamic range by lowering the sensitivity. According to the present invention, however, the imaging device can measure the temperatures of the furnace with high resolution, and can observe a plurality of temperature areas simultaneously. For example, the imaging device allows a normal-temperature region and the furnace to be observed at the same time for thereby permitting the user to observe the furnace temperatures while observing surrounding temperature conditions.

Figure 11:
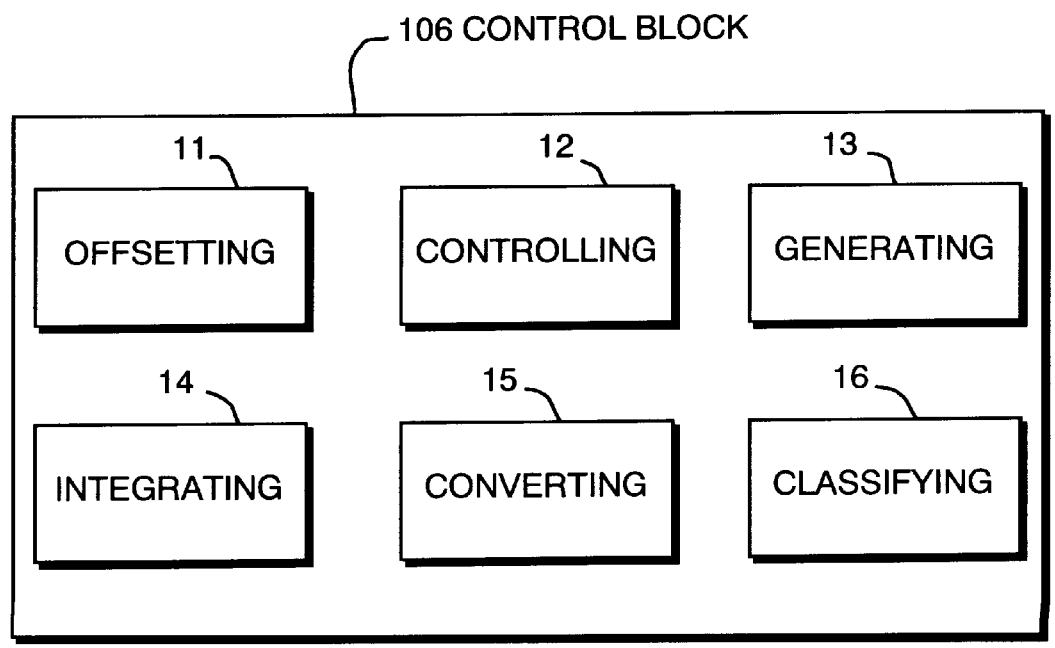
FIG. 11 is a block diagram of an imaging device according to the present invention.

As shown in FIG. 11, one arrangement of the control block 106 comprises section of offsetting 11 for offsetting the electric signal outputted from the amplifier 102 by predetermined quantity, section of controlling 12 for controlling the variable amplification factor of the variable-again amplifier 104 within one frame of the electric signal, section of generating 13 for generating a frequency map of intensities of light incident upon the sensor 101, section of integrating 14 for integrating frequency map with respect to intensities of light incident upon the sensor 101, section of converting 15 for converting frequency map into parts having frequencies greater than a predetermined level and intensities adjacent to each other, section of classifying 16 for classifying the parts into groups according to intensities of light incident upon the sensor 101.

While preferred embodiments of the present invention have been described using specific terms, such description is for illustrative purposes only, and it is to be understood that changes and variations may be made without departing from the spirit or scope of the following claims.

What is claimed is:

1. An imaging device comprising:
   detecting means for detecting a radiation radiated from a subject, converting the detected radiation into an electric signal, and outputting the electric signal;
   first amplifying means for amplifying the electric signal from said detecting means with a predetermined amplification factor and outputting the amplified electric signal;
   second amplifying means for amplifying the electric signal from said first amplifying means with a variable amplification factor and outputting the amplified electric signal;
   display means for displaying an image of said subject based on the electric signal outputted from said second amplifying means; and
   control means for controlling the variable amplification factor of said second amplifying means based on the electric signal outputted from said first amplifying means.

2. An imaging device according to claim 1, wherein said control means comprises means for controlling the variable amplification factor of said second amplifying means within one frame of the electric signal.

3. An imaging device comprising:
   detecting means for detecting a radiation radiated from a subject, converting the detected radiation into an electric signal, and outputting the electric signal;
   first amplifying means for amplifying the electric signal from said detecting means with a predetermined amplification factor and outputting the amplified electric signal;
   second amplifying means for amplifying the electric signal from said first amplifying means with a variable amplification factor and outputting the amplified electric signal;
   display means for displaying an image of said subject based on the electric signal outputted from said second amplifying means; and
   control means for offsetting the electric signal outputted from said first amplifying means by a predetermined quantity and controlling the variable amplification factor of said second amplifying means based on the electric signal outputted from said first amplifying means.

4. An imaging device according to claim 3, wherein said control means comprises means for offsetting the electric signal outputted from said first amplifying means by said predetermined quantity and controlling the variable amplification factor of said second amplifying means within one frame of the electric signal.

5. An imaging device according to claim 3, wherein said control means comprises means for generating a frequency map of intensities of light incident upon said detecting means.

6. An imaging device comprising:
   detecting means for detecting a radiation radiated from a subject, converting the detected radiation into an electric signal, and outputting the electric signal;
   first amplifying means for amplifying the electric signal from said detecting means with a predetermined amplification factor and outputting the amplified electric signal;
   second amplifying means for amplifying the electric signal from said first amplifying means with a variable amplification factor and outputting the amplified electric signal;
   display means for displaying an image of said subject based on the electric signal outputted from said second amplifying means; and
   control means for offsetting the electric signal outputted from said first amplifying means by a predetermined quantity and controlling the variable amplification factor of said second amplifying means based on the electric signal outputted from said first amplifying means;
   said control means comprising:
     means for offsetting the electric signal outputted from said first amplifying means by said predetermined quantity and controlling the variable amplification factor of said second amplifying means within one frame of the electric signal; and
     means for generating a frequency map of intensities of light incident upon said detecting means.

7. An imaging device according to claim 6, wherein said control means comprises means for integrating said frequency map with respect to intensities of light incident upon said detecting means.

8. An imaging device comprising:
  detecting means for detecting a radiation radiated from a subject, converting the detected radiation into an electric signal, and outputting the electric signal;
  first amplifying means for amplifying the electric signal from said detecting means with a predetermined amplification factor and outputting the amplified electric signal;
  second amplifying means for amplifying the electric signal from said first amplifying means with a variable amplification factor and outputting the amplified electric signal;
  display means for displaying an image of said subject based on the electric signal outputted from said second amplifying means; and
  control means for offsetting the electric signal outputted from said first amplifying means by a predetermined quantity and controlling the variable amplification factor of said second amplifying means based on the electric signal outputted from said first amplifying means;
  said control means comprising:
    means for generating a frequency map of intensities of light incident upon said detecting means; and
    means for integrating said frequency map with respect to intensities of light incident upon said detecting means.

9. An imaging device comprising:
  detecting means for detecting a radiation radiated from a subject, converting the detected radiation into an electric signal, and outputting the electric signal;
  first amplifying means for amplifying the electric signal from said detecting means with a predetermined amplification factor and outputting the amplified electric signal;
  second amplifying means for amplifying the electric signal from said first amplifying means with a variable amplification factor and outputting the amplified electric signal;
  display means for displaying an image of said subject based on the electric signal outputted from said second amplifying means; and
  control means for offsetting the electric signal outputted from said first amplifying means by a predetermined quantity and controlling the variable amplification factor of said second amplifying means based on the electric signal outputted from said first amplifying means;
  said control means comprising:
    means for generating a frequency map of intensities of light incident upon said detecting means; and
    means for converting said frequency map into parts having frequencies greater than a predetermined level and intensities adjacent to each other.

10. An imaging device according to claim 9, wherein said control means comprises means for offsetting the electric signal outputted from said first amplifying means by (max−min)/2 where max represents a maximum intensity of incident light in the parts and min represents a minimum intensity of incident light in the parts.

11. An imaging device according to claim 9, wherein said control means comprises means for controlling the variable amplification factor of said second amplifying means in proportion to 1/(max−min) where max represents a maximum intensity of incident light in the parts and min represents a minimum intensity of incident light in the parts.

12. An imaging device according to claim 9, wherein said display means comprises means for displaying pixels in a selected one of the parts in a monochromatic gray scale mode and displaying pixels in the other parts in a color display mode.

13. An imaging device according to claim 9, wherein said display means has a plurality of windows and comprises means for displaying pixels in the parts in said windows, respectively.

14. An imaging device according to claim 9, wherein said display means has a plurality of display monitor units and comprises means for displaying pixels in the parts in said display monitor units, respectively.

15. An imaging device comprising:
  detecting means for detecting a radiation radiated from a subject, converting the detected radiation into an electric signal, and outputting the electric signal;
  first amplifying means for amplifying the electric signal from said detecting means with a predetermined amplification factor and outputting the amplified electric signal;
  second amplifying means for amplifying the electric signal from said first amplifying means with a variable amplification factor and outputting the amplified electric signal;
  display means for displaying an image of said subject based on the electric signal outputted from said second amplifying means; and
  control means for offsetting the electric signal outputted from said first amplifying means by a predetermined quantity and controlling the variable amplification factor of said second amplifying means based on the electric signal outputted from said first amplifying means;
  said control means comprising:
    means for offsetting the electric signal outputted from said first amplifying means by said predetermined quantity and controlling the variable amplification factor of said second amplifying means within one frame of the electric signal;
    means for generating a frequency map of intensities of light incident upon said detecting means; and
    means for converting said frequency map into parts having frequencies greater than a predetermined level and intensities adjacent to each other.

16. An imaging device according to claim 15, wherein said control means comprises means for offsetting the electric signal outputted from said first amplifying means by (max−min)/2 where max represents a maximum intensity of incident light in the parts and min represents a minimum intensity of incident light in the parts.

17. An imaging device according to claim 15, wherein said control means comprises means for controlling the variable amplification factor of said second amplifying means in proportion to 1/(max−min) where max represents a maximum intensity of incident light in the parts and min represents a minimum intensity of incident light in the parts.

18. An imaging device according to claim 15, wherein said display means comprises means for displaying pixels in a selected one of the parts in a monochromatic gray scale mode and displaying pixels in the other parts in a color display mode.

19. An imaging device according to claim 15, wherein said display means has a plurality of windows and comprises means for displaying pixels in the parts in said windows, respectively.

20. An imaging device according to claim 15, wherein said display means has a plurality of display monitor units and comprises means for displaying pixels in the parts in said display monitor units, respectively.

21. An imaging device comprising:

detecting means for detecting a radiation radiated from a subject, converting the detected radiation into an electric signal, and outputting the electric signal;

first amplifying means for amplifying the electric signal from said detecting means with a predetermined amplification factor and outputting the amplified electric signal;

second amplifying means for amplifying the electric signal from said first amplifying means with a variable amplification factor and outputting the amplified electric signal;

display means for displaying an image of said subject based on the electric signal outputted from said second amplifying means; and control means for offsetting the electric signal outputted from said first amplifying means by a predetermined quantity and controlling the variable amplification factor of said second amplifying means based on the electric signal outputted from said first amplifying means;

said control means comprising:

means for generating a frequency map of intensities of light incident upon said detecting means;

means for integrating said frequency map with respect to intensities of light incident upon said detecting means; and means for converting said frequency map into parts having frequencies greater than a predetermined level and intensities adjacent to each other.

22. An imaging device according to claim 21, wherein said control means comprises means for offsetting the electric signal outputted from said first amplifying means by (max−min)/2 where max represents a maximum intensity of incident light in the parts and min represents a minimum intensity of incident light in the parts.

23. An imaging device according to claim 21, wherein said control means comprises means for controlling the variable amplification factor of said second amplifying means in proportion to 1/(max−min) where max represents a maximum intensity of incident light in the parts and min represents a minimum intensity of incident light in the parts.

24. An imaging device according to claim 21, wherein said display means comprises means for displaying pixels in a selected one of the parts in a monochromatic gray scale mode and displaying pixels in the other parts in a color display mode.

25. An imaging device according to claim 21, wherein said display means has a plurality of windows and comprises means for displaying pixels in the parts in said windows, respectively.

26. An imaging device according to claim 21, wherein said display means has a plurality of display monitor units and comprises means for displaying pixels in the parts in said display monitor units, respectively.

27. An imaging device comprising:

detecting means for detecting a radiation radiated from a subject, converting the detected radiation into an electric signal, and outputting the electric signal;

first amplifying means for amplifying the electric signal from said detecting means with a predetermined amplification factor and outputting the amplified electric signal;

second amplifying means for amplifying the electric signal from said first amplifying means with a variable amplification factor and outputting the amplified electric signal;

display means for displaying an image of said subject based on the electric signal outputted from said second amplifying means; and control means for offsetting the electric signal outputted from said first amplifying means by a predetermined quantity and controlling the variable amplification factor of said second amplifying means based on the electric signal outputted from said first amplifying means;

said control means comprising:

means for offsetting the electric signal outputted from said first amplifying means by said predetermined quantity and controlling the variable amplification factor of said second amplifying means within one frame of the electric signal;

means for generating a frequency map of intensities of light incident upon said detecting means;

means for integrating said frequency map with respect to intensities of light incident upon said detecting means; and means for converting said frequency map into parts having frequencies greater than a predetermined level and intensities adjacent to each other.

28. An imaging device according to claim 27, wherein said control means comprises means for offsetting the electric signal outputted from said first amplifying means by (max−min)/2 where max represents a maximum intensity of incident light in the parts and min represents a minimum intensity of incident light in the parts.

29. An imaging device according to claim 27, wherein said control means comprises means for controlling the variable amplification factor of said second amplifying means in proportion to 1/(max−min) where max represents a maximum intensity of incident light in the parts and min represents a minimum intensity of incident light in the parts.

30. An imaging device according to claim 27, wherein said display means comprises means for displaying pixels in a selected one of the parts in a monochromatic gray scale mode and displaying pixels in the other parts in a color display mode.

31. An imaging device according to claim 27, wherein said display means has a plurality of windows and comprises means for displaying pixels in the parts in said windows, respectively.

32. An imaging device according to claim 27, wherein said display means has a plurality of display monitor units and comprises means for displaying pixels in the parts in said display monitor units, respectively.

33. An imaging device comprising:

detecting means for detecting a radiation radiated from a subject, converting the detected radiation into an electric signal, and outputting the electric signal;

first amplifying means for amplifying the electric signal from said detecting means with a predetermined amplification factor and outputting the amplified electric signal;

second amplifying means for amplifying the electric signal from said first amplifying means with a variable amplification factor and outputting the amplified electric signal;

display means for displaying an image of said subject based on the electric signal outputted from said second amplifying means; and control means for offsetting the electric signal outputted from said first amplifying means by a predetermined quantity and controlling the variable amplification factor of said second amplifying means based on the electric signal outputted from said first amplifying means;

said control means comprising:

means for generating a frequency map of intensities of light incident upon said detecting means;

means for converting said frequency map into parts having frequencies greater than a predetermined level and intensities adjacent to each other; and means for classifying the parts into groups according to intensities of light incident upon said detecting means.

34. An imaging device according to claim 33, wherein said control means comprises means for offsetting the electric signal outputted from said first amplifying means by (max−min)/2 where max represents a maximum intensity of incident light in the parts or the groups and min represents a minimum intensity of incident light in the parts or the groups.

35. An imaging device according to claim 33, wherein said control means comprises means for controlling the variable amplification factor of said second amplifying means in proportion to 1/(max−min) where max represents a maximum intensity of incident light in the parts or the groups and min represents a minimum intensity of incident light in the parts or the groups.

36. An imaging device according to claim 33, wherein said display means comprises means for displaying pixels in a selected one of the parts or the groups in a monochromatic gray scale mode and displaying pixels in the other parts or the other groups in a color display mode.

37. An imaging device according to claim 33, wherein said display means has a plurality of windows and comprises means for displaying pixels in the parts or the groups in said windows, respectively.

38. An imaging device according to claim 33, wherein said display means has a plurality of display monitor units and comprises means for displaying pixels in the parts or the groups in said display monitor units, respectively.

39. An imaging device comprising:

detecting means for detecting a radiation radiated from a subject, converting the detected radiation into an electric signal, and outputting the electric signal;

first amplifying means for amplifying the electric signal from said detecting means with a predetermined amplification factor and outputting the amplified electric signal;

second amplifying means for amplifying the electric signal from said first amplifying means with a variable amplification factor and outputting the amplified electric signal;

display means for displaying an image of said subject based on the electric signal outputted from said second amplifying means; and control means for offsetting the electric signal outputted from said first amplifying means by a predetermined quantity and controlling the variable amplification factor of said second amplifying means based on the electric signal outputted from said first amplifying means;

said control means comprising:

means for offsetting the electric signal outputted from said first amplifying means by said predetermined quantity and controlling the variable amplification factor of said second amplifying means within one frame of the electric signal;

means for generating a frequency map of intensities of light incident upon said detecting means;

means for converting said frequency map into parts having frequencies greater than a predetermined level and intensities adjacent to each other; and means for classifying the parts into groups according to intensities of light incident upon said detecting means.

40. An imaging device according to claim 39, wherein said control means comprises means for offsetting the electric signal outputted from said first amplifying means by (max−min)/2 where max represents a maximum intensity of incident light in the parts or the groups and min represents a minimum intensity of incident light in the parts or the groups.

41. An imaging device according to claim 39, wherein said control means comprises means for controlling the variable amplification factor of said second amplifying means in proportion to 1/(max−min) where max represents a maximum intensity of incident light in the parts or the groups and min represents a minimum intensity of incident light in the parts or the groups.

42. An imaging device according to claim 39, wherein said display means comprises means for displaying pixels in a selected one of the parts or the groups in a monochromatic gray scale mode and displaying pixels in the other parts or the other groups in a color display mode.

43. An imaging device according to claim 39, wherein said display means has a plurality of windows and comprises means for displaying pixels in the parts or the groups in said windows, respectively.

44. An imaging device according to claim 39, wherein said display means has a plurality of display monitor units and comprises means for displaying pixels in the parts or the groups in said display monitor units, respectively.

45. An imaging device comprising:

detecting means for detecting a radiation radiated from a subject, converting the detected radiation into an electric signal, and outputting the electric signal;

first amplifying means for amplifying the electric signal from said detecting means with a predetermined amplification factor and outputting the amplified electric signal;

second amplifying means for amplifying the electric signal from said first amplifying means with a variable amplification factor and outputting the amplified electric signal;

display means for displaying an image of said subject based on the electric signal outputted from said second amplifying means; and control means for offsetting the electric signal outputted from said first amplifying means by a predetermined quantity and controlling the variable amplification factor of said second amplifying means based on the electric signal outputted from said first amplifying means;

said control means comprising:

means for generating a frequency map of intensities of light incident upon said detecting means;

means for integrating said frequency map with respect to intensities of light incident upon said detecting means;

means for converting said frequency map into parts having frequencies greater than a predetermined level and intensities adjacent to each other; and means for classifying the parts into groups according to intensities of light incident upon said detecting means.

46. An imaging device according to claim 45, wherein said control means comprises means for offsetting the electric signal outputted from said first amplifying means by (max−min)/2 where max represents a maximum intensity of incident light in the parts or the groups and min represents a minimum intensity of incident light in the parts or the groups.

47. An imaging device according to claim 45, wherein said control means comprises means for controlling the variable amplification factor of said second amplifying means in proportion to 1/(max−min) where max represents a maximum intensity of incident light in the parts or the groups and min represents a minimum intensity of incident light in the parts or the groups.

48. An imaging device according to claim 45, wherein said display means comprises means for displaying pixels in a selected one of the parts or the groups in a monochromatic gray scale mode and displaying pixels in the other parts or the other groups in a color display mode.

49. An imaging device according to claim 45, wherein said display means has a plurality of windows and comprises means for displaying pixels in the parts or the groups in said windows, respectively.

50. An imaging device according to claim 45, wherein said display means has a plurality of display monitor units and comprises means for displaying pixels in the parts or the groups in said display monitor units, respectively.

51. An imaging device comprising:
   detecting means for detecting a radiation radiated from a subject, converting the detected radiation into an electric signal, and outputting the electric signal;
   first amplifying means for amplifying the electric signal from said detecting means with a predetermined amplification factor and outputting the amplified electric signal;
   second amplifying means for amplifying the electric signal from said first amplifying means with a variable amplification factor and outputting the amplified electric signal;
   display means for displaying an image of said subject based on the electric signal outputted from said second amplifying means; and
   control means for offsetting the electric signal outputted from said first amplifying means by a predetermined quantity and controlling the variable amplification factor of said second amplifying means based on the electric signal outputted from said first amplifying means;
   said control means comprising:
      means for offsetting the electric signal outputted from said first amplifying means by said predetermined quantity and controlling the variable amplification factor of said second amplifying means within one frame of the electric signal;
      means for generating a frequency map of intensities of light incident upon said detecting means;
      means for integrating said frequency map with respect to intensities of light incident upon said detecting means;
      means for converting said frequency map into parts having frequencies greater than a predetermined level and intensities adjacent to each other; and
      means for classifying the parts into groups according to intensities of light incident upon said detecting means.

52. An imaging device according to claim 51, wherein said control means comprises means for offsetting the electric signal outputted from said first amplifying means by (max−min)/2 where max represents a maximum intensity of incident light in the parts or the groups and min represents a minimum intensity of incident light in the parts or the groups.

53. An imaging device according to claim 51, wherein said control means comprises means for controlling the variable amplification factor of said second amplifying means in proportion to 1/(max−min) where max represents a maximum intensity of incident light in the parts or the groups and min represents a minimum intensity of incident light in the parts or the groups.

54. An imaging device according to claim 51, wherein said display means comprises means for displaying pixels in a selected one of the parts or the groups in a monochromatic gray scale mode and displaying pixels in the other parts or the other groups in a color display mode.

55. An imaging device according to claim 51, wherein said display means has a plurality of windows and comprises means for displaying pixels in the parts or the groups in said windows, respectively.

56. An imaging device according to claim 51, wherein said display means has a plurality of display monitor units and comprises means for displaying pixels in the parts or the groups in said display monitor units, respectively.

* * * * *